(No Model.) 3 Sheets—Sheet 1.
J. W. EVANS.
PERCOLATOR.
No. 381,062. Patented Apr. 10, 1888.
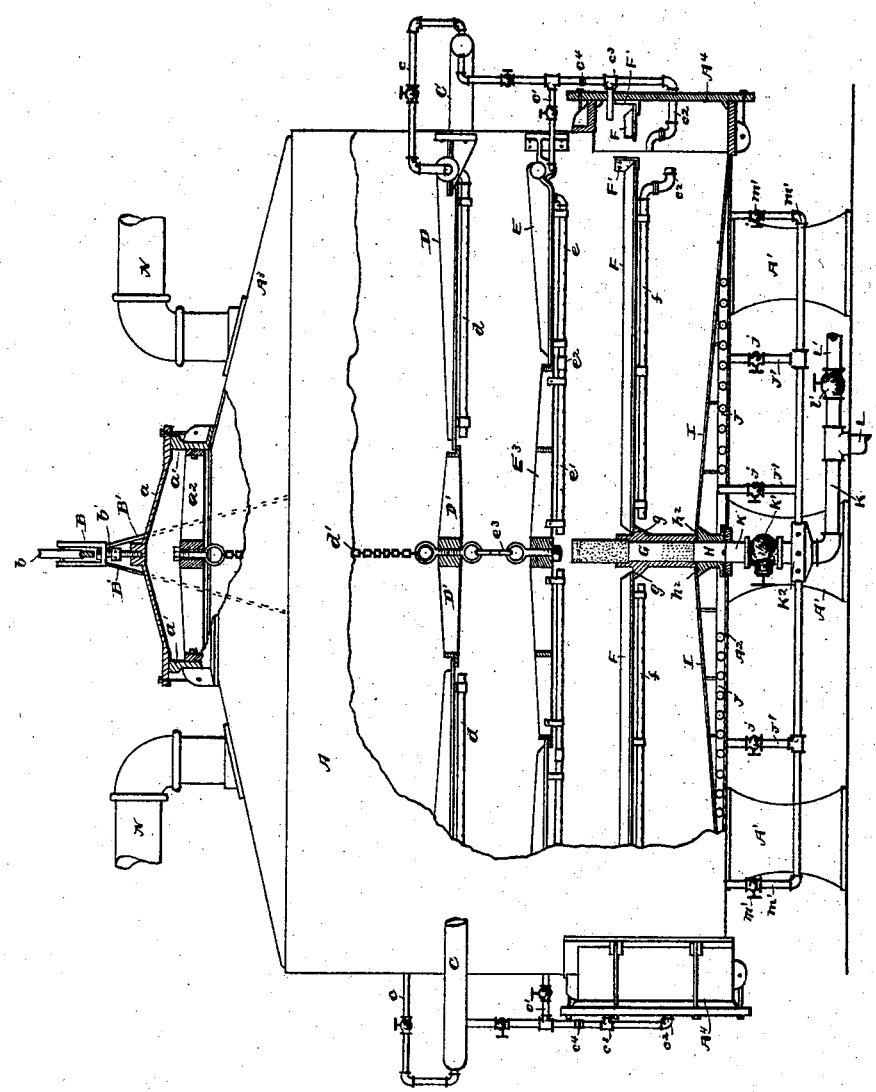

(No Model.) 3 Sheets—Sheet 2.
J. W. EVANS.
PERCOLATOR.
No. 381,062. Patented Apr. 10, 1888.
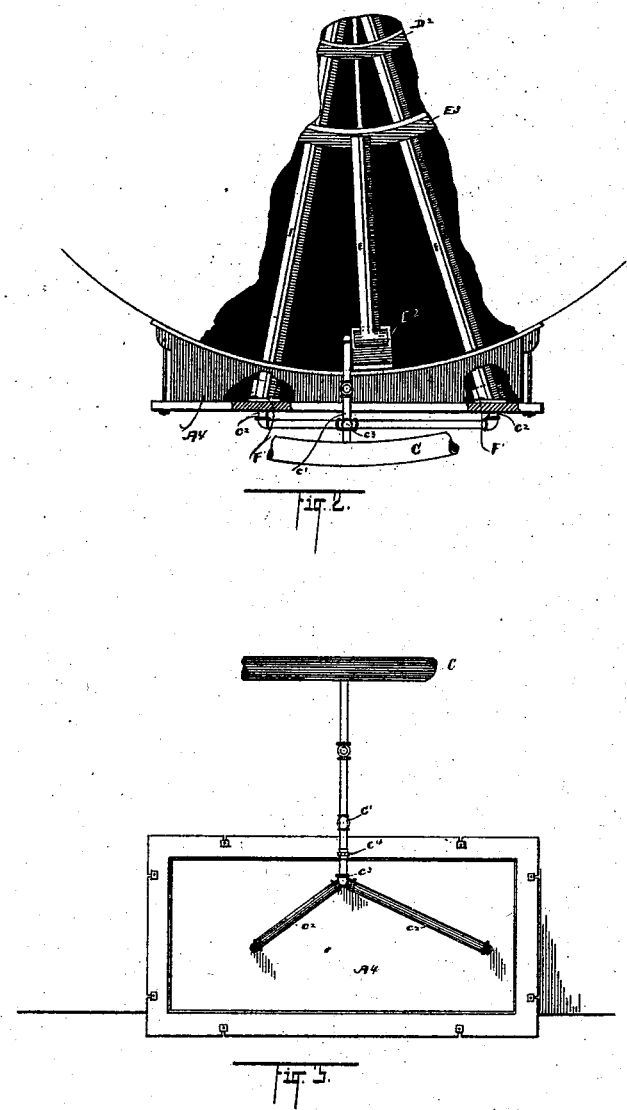

(No Model.) 3 Sheets—Sheet 3.
J. W. EVANS.
PERCOLATOR.
No. 381,062. Patented Apr. 10, 1888.
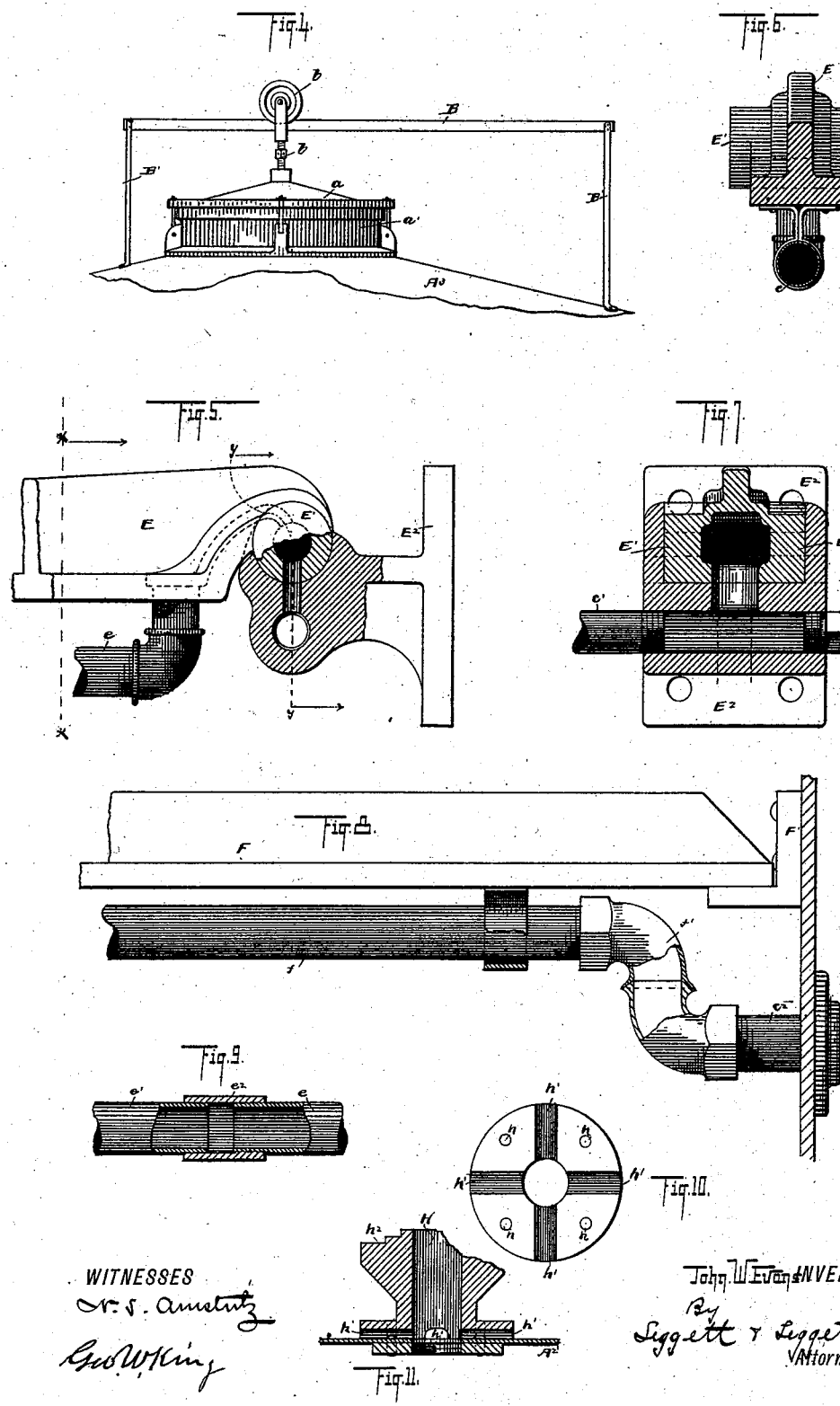
WITNESSES
INVENTOR
John W. Evans
By Liggett & Liggett
Attorneys

UNITED STATES PATENT OFFICE.

JOHN W. EVANS, OF CLEVELAND, OHIO.

PERCOLATOR.

SPECIFICATION forming part of Letters Patent No. 381,062, dated April 10, 1888.

Application filed July 12, 1886. Serial No. 207,850. (No model.)

*To all whom it may concern:*

Be it known that I, JOHN W. EVANS, of Cleveland, in the county of Cuyahoga and State of Ohio, have invented certain new and useful Improvements in Percolators; and I do hereby declare the following to be a full, clear, and exact description of the invention, such as will enable others skilled in the art to which it pertains to make and use the same.

My invention relates to improvements in percolators designed more especially for the extraction of cotton-seed oil by the naphtha process.

My present invention is designed as an improvement on a percolator for which Letters Patent of the United States No. 245,365 were granted to me August 9, 1880.

My former percolator, patented as aforesaid, was of considerable height, usually twelve feet or more in the clear. Inside of the percolator was a series of radial arms or so-called "breakers," having steam-pipes attached underneath. The breakers were supported at their inner ends by a center piece, and the outer ends were hinged to brackets, the latter being secured to the walls of the container some five or six feet from the bottom of the latter. The brackets had hollow trunnions that connected with the corresponding chambers in the breakers, and so arrranged that the perforated steam-pipe connected with the breakers and the supply-pipe connected with the brackets were in open relation. By depressing the center support the breakers and attached perforated pipes were turned down alongside the walls of the container without breaking or separating the aforesaid steam-connections. This part of the apparatus I employ in my new percolator.

Owing to the fact that cotton-seed meal packs much more densely than linseed-meal, better results are had by building the percolators of less height than formerly—say about seven feet (more or less) in the clear—and making them of such a large diameter as will give the necessary capacity. It is also found to be necessary to provide additional breakers located on a lower plane and cross-bars located still lower, each having perforated steam-pipes attached to introduce steam into the central and lower portion of the mass. A slightly-conical false bottom is made of perforated plate, and between the perforate and imperforate bottoms is located a heating-coil. A system of pipes leading up through the bottom of the percolator is arranged with suitable valves and branch pipes, by means of which these pipes are used to admit steam for heating, and are also used for drawing off the oil. Various other improvements are had in the details of construction, which are more clearly shown in the accompanying drawings.

Figure 1 is a side elevation of my improved percolator, portions of the side wall thereof being broken away to show the internal construction. Fig. 2 is a partial plan view, portions of the wall being broken away to show the internal mechanism. Fig. 3 is an enlarged elevation of one of the doors of the percolator. Fig. 4 is an enlarged elevation of the cover of the man-hole and the tramway for removing the cover. Fig. 5 is a side elevation, partly in section, of one of the breakers E and supporting-brackets $E^2$. Fig. 6 is an elevation in section on the line of $x\ x$, Fig. 5, looking to the right hand. Fig. 7 is an elevation in transverse section on the bent line $y\ y$, Fig. 5, looking in the direction of the arrows. Fig. 8 is a side elevation of a portion of a cross-bar, F, showing the manner of connecting the steam-pipes $f$ and $c^2$. Fig. 9 is a plan view, partly in section, showing the manner of connecting the pipes $e$ and $e'$. Fig. 10 is a bottom plan of the block H. Fig. 11 is an elevation in section of the block H.

A represents the container or body of the percolator, and is made usually of heavy boiler-plate and mounted on legs $A'$. The container has substantially a flat bottom, $A^2$, and a conical top, $A^3$, the latter being provided at the apex with a large man-hole and man-hole plate or cover, $a$. The flange $a'$ around the man-hole is of considerable depth to make room for a cross-bar, $a^2$, that is secured to the inside of the flange out of the way of the cover. The cross-bar supports the center piece, hereinafter described. The cover $a$ is usually three or four feet in diameter, and is consequently too heavy to handle. I have therefore provided a tramway for moving this cover, the same consisting of a rail, B, supported on legs $B'$, the latter being attached to the top $A^3$ of the percolator. A flanged carrying-wheel, b, travels on the rail, and the yoke of the wheel has a depending swivel-bolt, b', that screws into the center of the cover a, by means of which the cover may be raised from its seat and carried to one side on the tramway. The container is provided with one or more doors, $A^4$, usually two in number and located on opposite sides. These doors reach to near the bottom of the container, and are usually three or four feet square, more or less, so that workmen can easily enter the doorway for shoveling out the contents of the container. Some distance above the line of the door is a large steam-pipe, C, that encircles the container, and from which branch pipes lead into the container at different points—to wit, the pipes c lead to the breakers D, and the pipes c' to the breakers E, and the pipes $c^2$ to cross-bars F. The breakers D are hinged to the brackets D', the latter being secured to the container inside thereof. The brackets and trunnions of the breaker are chambered with suitable openings connecting the chamber when the breakers are in a horizontal position. The chamber in the bracket is connected with the pipe c, and the chamber in the breaker is connected with a perforated pipe, d, that is secured to the under side of the breaker. The breakers at the inner end are supported by a center piece, $D^2$, the latter being supported by a chain, d', that is detachably secured to the cross-piece a. When the parts are in working position, an open passage-way is had from the pipes c through the chambers of the bracket and breaker to the pipes d. When the center piece $D^2$ is lowered, by unfastening the chain the brackets D can turn down by the side of the container. These breakers are arranged so that none of them come in front of the doors. The breakers D and attachments are substantially the same as were described in my patent aforesaid, and therefore it is not considered necessary to give a more detailed description of them in this specification.

The breakers E are located on a lower plane, and consequently have to be shorter than the brackets D in order to fold down inside. The center piece $E^3$, that supports these brackets, is, therefore, correspondingly larger in diameter. The brackets $E^2$ have perforated pipes e attached, and are arranged substantially the same as the bracket D, except that a breaker E comes in front of a door and when turned down would be in the way. I have therefore made these breakers that are in front of the door with a trunnion, E', on either side, and the brackets $E^2$ are bifurcated to receive the breakers and have only half-boxes to receive the trunnions, as shown in Figs. 5, 6, and 7.

The trunnions and bearings of the brackets have ground joints, by reason of which the weight of the bracket and of the material resting on the bracket is sufficient to hold the breakers down to their seats in the bracket and form a steam-joint. When these breakers are turned down, they may be lifted out of the brackets and removed. The pipe e is in open relation with the pipe c' when the breakers are in a horizontal position. The center piece $E^3$ is supported by a chain, $e^3$, that is attached to the center-piece $D^2$.

Perforated pipes e' are loosely secured to the part $E^3$, so as to be movable endwise. The pipes e' are provided, respectively, with couplings $e^2$, the outer end of which is made large enough to slip onto the unthreaded inner ends of the pipes e. Of course such joints will leak steam more or less; but in place of such leakage doing any damage it only saves perforating the pipe at this part. On a plane about midway of the height of the doors, or perhaps a trifle lower, are located the cross-bars F. These bars are supported at their outer ends by angle-plates F' and are supported at the center by the shoulder g of the stand-pipe G. The bars F have respectively attached underneath perforated pipes f, the latter having elbows f' at the outer ends that present downward and engage the upturned elbows on the pipe $c^2$. The end of one elbow is made conical and the end of the opposing elbow is made correspondingly concave, forming what is known as "ball-and-socket" elbows. These joints are of course ground together, and the pipe f stands off from the bar F, so as to cause the elbows to be pressed firmly together when the bar F rests on the supporting angle-plate. The pipe $c^2$ is branched, as shown in Fig. 3, on the outside to lead to the two bars F that are supported from the door, and above the door the pipe $c^2$ is provided with a sleeve-union, $c^4$, by loosening which the pipes connected with the door are removed with the door. At the point $c^3$, where the branch pipes $c^2$ join the main pipe, a short perforated pipe may lead through the door and discharge steam just inside the latter. The standard G is perforated and rests on a hollow block, H. The latter is shouldered on top, and the central portion extends up into the pipe G a short distance to hold the latter in position. The block H is held in place by dowel-pins h. This block, on the bottom side, has channels h' leading into the central hole of the block, through which channels oil can be drained from the container.

Perforated plates I rest on the bottom $A^2$ at the inner periphery of the container, and the inner ends of these plates rest on the shoulders $h^2$ of the block H. Between the bottom $A^2$ and the plates I are located coils of pipe J for heating. A large pipe, K, is secured, usually by means of a flange, to the under side of the container in position to register with the passage-ways through the blocks H and stand-pipe G. The pipe K has a valve, K', and a manifold, $K^2$, and branches L and L', the latter having, respectively, valves l and l'. From the manifold leads the pipes J', that connect with the coil J, and the pipes m, that lead up through the bottom of the container, near the periphery of the latter. These pipes are provided, respectively, with valves j and m'. The pipe K and its branches are used for admitting steam and for draining oil from the container, the different valves being opened and closed accordingly.

N are large escape-pipes leading from the container to condenser. (Not shown.) Through these pipes the evaporized naphtha passes off.

In operating the percolator the container is filled with meal or other material from which oil is to be extracted, the same being admitted through the man-hole. The man-hole having been closed, hot naphtha is discharged into the container in sufficient quantities to cover the meal or other material. This naphtha and the mass are kept to the desired temperature—say from 150° to 180° Fahrenheit, more or less—for perhaps three days, more or less, or until the oil is extracted from the mass. During this time the solution of oil and naphtha is drawn off from time to time and fresh heated naphtha is supplied until the oil is entirely extracted from the mass, after which the oil and naphtha are drawn from the container and steam is admitted to vaporize the naphtha that was left in the mass. The doors are then opened and the residuum is shoveled out.

The bars F, the breakers E, that hang in front of the doors, and the perforated plates I may all in turn be removed, if desired, to clean out the inside of the percolator. The plates, bars, and breakers are then returned to their place and the doors closed, after which the percolator is ready for another charge. The percolator, although especially designed for the extraction of oil from cotton-seed, is well adapted for extracting oil from linseed, or, in fact, from any substance that contains oil.

I am aware that it is old in rendering-tanks to provide the tank with a perforated conical strainer and with steam-pipes for admitting steam into the space between the strainer and the bottom of the tank, and also that it is old in rendering-tanks having perforated conical strainers to provide the kettle or tank with a steam-jacket, the latter forming a portion of the bottom of the kettle or tank, and hence I make no claim to such constructions.

What I claim is—

1. In a percolator for extracting oil, the combination, with so-called "breakers" hinged to the side of the percolator, and a depressible center piece for supporting the inner end of the breakers, said breakers having perforated pipes attached underneath, of corresponding perforated pipes connected with the center piece, the latter pipes being made movable to couple or uncouple with the pipes of the breakers, substantially as set forth.

2. In a percolator for extracting oil, the combination, with breakers, perforated pipes, and center piece, substantially as indicated, of supporting bifurcated brackets having hollow seats forming half-boxes, and corresponding hollow trunnions on the breakers for engaging the said seats, forming steam-connections between the outside pipes and the said perforated pipes, and arranged substantially as indicated, whereby the breakers are detachable from the brackets.

3. In a percolator, the combination, with cross bars, and perforated pipes connected with the cross-bars, of ball-and-socket elbows connecting the perforated pipes with the supply-pipes, substantially as described.

4. In a percolator, the combination, with perforated plates forming a conical false bottom, of a heating-coil located between the perforate and imperforate bottoms, substantially as set forth.

5. In a percolator, the combination, with cross-bars and the perforated pipes, substantially as indicated, of a perforated stand-pipe, the same having shoulders for supporting the cross-bars, and a block for supporting the stand-pipe and the inner ends of the plates of the false bottom, said block having channels on the under side thereof, substantially as set forth.

In testimony whereof I sign this specification, in the presence of two witnesses, this 29th day of May, 1886.

JOHN W. EVANS.

Witnesses:
CHAS. H. DORER,
ALBERT E. LYNCH.